(12) United States Patent
Agerton et al.

(10) Patent No.: US 11,724,847 B2
(45) Date of Patent: Aug. 15, 2023

(54) BLOW MOLDED ARTICLE WITH DEBOSSING

(71) Applicant: The Procter & Gamble Company, Cincinnati, OH (US)

(72) Inventors: Mark Lewis Agerton, Mason, OH (US); Marc Andrew Mamak, Mason, OH (US); Amanda Susan Ehrhardt, Cincinnati, OH (US); Andrew Joseph Horton, Middletown, OH (US); Bradley Scott Neufarth, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/381,125

(22) Filed: Apr. 11, 2019

(65) Prior Publication Data

US 2020/0122873 A1   Apr. 23, 2020

Related U.S. Application Data

(60) Provisional application No. 62/748,062, filed on Oct. 19, 2018.

(51) Int. Cl.
| | | |
|---|---|---|
| *B65D 1/02* | (2006.01) | |
| *B32B 27/08* | (2006.01) | |
| *B32B 27/20* | (2006.01) | |
| *B65D 65/40* | (2006.01) | |

(52) U.S. Cl.
CPC ............ *B65D 1/0215* (2013.01); *B32B 27/08* (2013.01); *B32B 27/20* (2013.01); *B65D 65/403* (2013.01); *B32B 2307/412* (2013.01); *B32B 2307/538* (2013.01); *B32B 2439/60* (2013.01)

(58) Field of Classification Search
CPC .............................. B65D 23/14; B65D 1/0215
USPC ....................................... 206/459.5; 215/12.2
See application file for complete search history.

(56) References Cited

U.S. PATENT DOCUMENTS

| | | | | |
|---|---|---|---|---|
| 1,554,191 A | * | 9/1925 | Alexander | ............. B65D 23/14 |
| | | | | 40/310 |
| 3,222,439 A | | 12/1965 | Bolomey et al. | |
| 3,420,924 A | | 1/1969 | Mason et al. | |
| 3,550,197 A | * | 12/1970 | Lump | ................... B29C 33/424 |
| | | | | 425/525 |

(Continued)

FOREIGN PATENT DOCUMENTS

| | | |
|---|---|---|
| CN | 1538995 A | 10/2004 |
| CN | 1673284 A | 9/2005 |

(Continued)

OTHER PUBLICATIONS

U.S. Appl. No. 16/158,719, filed Oct. 12, 2018, Agerton et al.

(Continued)

*Primary Examiner* — Jeffrey R Allen
(74) *Attorney, Agent, or Firm* — Jay A. Krebs

(57) ABSTRACT

A blow molded multilayer article having a hollow body defined by a wall comprising at least three layers. The wall has a first Layer A comprising an outer surface of the wall, a second Layer A comprising the inner surface of the wall and a Layer B between the first and second Layer As. The B layer can contain an effect pigment and/or an opacifying pigment and the Layer As can be transparent. The wall contains a deboss element.

20 Claims, 6 Drawing Sheets

(56) References Cited

U.S. PATENT DOCUMENTS

| | | | |
|---|---|---|---|
| 4,421,560 A | 12/1983 | Kito et al. | |
| 4,457,961 A | 7/1984 | Nakazawa | |
| 4,535,901 A | 8/1985 | Okudaira | |
| 4,728,549 A | 3/1988 | Shimizu et al. | |
| 4,868,026 A | 9/1989 | Shimizu | |
| 4,919,983 A | 4/1990 | Fremin | |
| 4,957,949 A | 9/1990 | Kamada et al. | |
| 4,994,313 A | 2/1991 | Shimizu | |
| 5,431,697 A | 7/1995 | Kamata et al. | |
| 5,595,799 A | 1/1997 | Beck et al. | |
| 5,628,950 A | 5/1997 | Schrenk et al. | |
| 5,628,957 A * | 5/1997 | Collette | B29C 49/0005 264/512 |
| 5,712,009 A | 1/1998 | Moore et al. | |
| 5,849,224 A * | 12/1998 | Valyi | B29C 49/22 264/37.31 |
| 5,927,525 A * | 7/1999 | Darr | B29C 49/221 215/12.2 |
| 6,123,211 A | 9/2000 | Rashid et al. | |
| 6,129,960 A | 10/2000 | Kudert et al. | |
| 6,294,602 B1 | 9/2001 | Shimo et al. | |
| 6,296,911 B1 | 10/2001 | Catarineu | |
| 6,405,867 B1 | 6/2002 | Moore | |
| 6,562,276 B1 | 5/2003 | Shelby et al. | |
| 6,596,213 B2 | 7/2003 | Swenson | |
| 6,663,822 B1 | 12/2003 | Cargill | |
| 6,737,132 B1 | 5/2004 | Michihata et al. | |
| 6,815,080 B2 | 11/2004 | Omori | |
| 6,878,774 B2 | 4/2005 | Kikuchi et al. | |
| 6,911,266 B1 | 6/2005 | Skov | |
| 6,929,136 B2 | 8/2005 | Salazar-leal | |
| 6,929,836 B2 | 8/2005 | Kikuchi | |
| 7,534,829 B2 | 5/2009 | Tai et al. | |
| 7,662,466 B2 | 2/2010 | Seeboth et al. | |
| 7,828,890 B2 | 11/2010 | Henglein | |
| 7,906,054 B2 | 3/2011 | Hirschfelder et al. | |
| 8,097,317 B2 | 1/2012 | Katou et al. | |
| 8,124,234 B2 | 2/2012 | Weaver et al. | |
| 8,485,935 B2 | 7/2013 | Hecht | |
| 8,535,595 B2 | 9/2013 | Meiki et al. | |
| 8,580,365 B2 | 11/2013 | Abe | |
| 8,734,923 B2 | 5/2014 | Shi | |
| 8,883,920 B2 | 11/2014 | Inoue et al. | |
| 8,895,120 B2 | 11/2014 | Dierickx | |
| 8,968,147 B2 | 3/2015 | Hecht | |
| 9,000,068 B2 | 4/2015 | Trummer | |
| 9,114,895 B2 | 8/2015 | Sato et al. | |
| 9,162,429 B2 | 10/2015 | Suga et al. | |
| 9,597,825 B2 | 3/2017 | Schmidt et al. | |
| 9,708,092 B2 | 7/2017 | Bowen et al. | |
| 9,731,482 B2 | 8/2017 | Arakawa et al. | |
| 9,862,157 B2 | 1/2018 | Hosokoshiyama | |
| 10,279,948 B2 | 5/2019 | Yang et al. | |
| 10,518,922 B2 | 12/2019 | Yang et al. | |
| 11,046,473 B2 | 6/2021 | Agerton et al. | |
| 2002/0009565 A1 | 1/2002 | Fehn | |
| 2004/0146675 A1 | 7/2004 | Hashimoto et al. | |
| 2004/0194663 A1 | 10/2004 | Li | |
| 2005/0142309 A1 | 6/2005 | Goto et al. | |
| 2005/0170113 A1 | 8/2005 | Hill | |
| 2005/0170114 A1 | 8/2005 | Hill | |
| 2005/0287323 A1 | 12/2005 | Akiyama et al. | |
| 2006/0029823 A1 | 2/2006 | Brown | |
| 2008/0017076 A1 | 1/2008 | Noguchi | |
| 2008/0193787 A1 | 8/2008 | Dierickx | |
| 2008/0241447 A1 | 10/2008 | Shi | |
| 2008/0317989 A1 | 12/2008 | Abe et al. | |
| 2009/0233026 A1 * | 9/2009 | Akiyama | B32B 27/306 428/35.7 |
| 2010/0028577 A1 | 2/2010 | Siegl | |
| 2010/0206784 A1 | 8/2010 | Weaver et al. | |
| 2010/0307633 A1 | 12/2010 | Dierickx | |
| 2011/0100857 A1 | 5/2011 | Wang et al. | |
| 2012/0171401 A1 * | 7/2012 | Katou | B29C 49/22 428/35.7 |
| 2012/0256356 A1 | 10/2012 | Akiyama | |
| 2013/0069268 A1 | 3/2013 | Liu et al. | |
| 2013/0273287 A1 | 10/2013 | Luo et al. | |
| 2013/0313217 A1 * | 11/2013 | Yamamoto | B65D 1/0207 215/12.1 |
| 2014/0044904 A1 | 2/2014 | De Belder | |
| 2014/0054255 A1 | 2/2014 | Hosokoshiyama et al. | |
| 2014/0119813 A1 * | 5/2014 | Moselage, III | B29C 66/1122 403/270 |
| 2015/0079320 A1 | 3/2015 | Katou | |
| 2016/0017092 A1 | 1/2016 | Iwamoto et al. | |
| 2017/0021552 A1 | 1/2017 | Dygert | |
| 2017/0197351 A1 | 7/2017 | Chiba | |
| 2017/0204251 A1 | 7/2017 | Agerton et al. | |
| 2017/0259486 A1 | 9/2017 | Koerner | |
| 2018/0002071 A1 | 1/2018 | Hosokoshiyama et al. | |
| 2019/0009483 A1 | 1/2019 | Meadows et al. | |
| 2019/0105805 A1 | 4/2019 | Dubuque | |
| 2019/0112091 A1 | 4/2019 | Neufarth et al. | |
| 2020/0024021 A1 | 1/2020 | Agerton | |
| 2020/0171727 A1 | 6/2020 | Witz | |
| 2020/0324455 A1 | 10/2020 | Agerton | |
| 2020/0324456 A1 | 10/2020 | Mamak | |
| 2020/0399463 A1 | 12/2020 | Wieloch et al. | |
| 2021/0206141 A1 | 7/2021 | Neufarth et al. | |
| 2021/0221551 A1 | 7/2021 | Neufarth et al. | |
| 2021/0269188 A1 | 9/2021 | Agerton et al. | |
| 2021/0316493 A1 | 10/2021 | Mamak et al. | |

FOREIGN PATENT DOCUMENTS

| | | |
|---|---|---|
| CN | 1988995 A | 6/2007 |
| CN | 201484752 U | 5/2010 |
| CN | 102026793 A | 4/2011 |
| CN | 102498045 A | 6/2012 |
| CN | 102575076 A | 7/2012 |
| CN | 106573447 A | 4/2017 |
| CN | 107548352 A | 1/2018 |
| CN | 211732096 U | 10/2020 |
| DE | 202004018510 U1 | 9/2005 |
| DE | 102005022633 A1 | 11/2006 |
| DE | 102013011403 A1 | 1/2015 |
| EP | 0328014 A2 | 8/1989 |
| EP | 0354255 A1 | 2/1990 |
| EP | 2231373 B1 | 7/2015 |
| GB | 201203964 | 4/2012 |
| JP | S5381569 A | 7/1978 |
| JP | S57128520 A | 8/1982 |
| JP | S6294541 A | 5/1987 |
| JP | H05042641 A | 2/1993 |
| JP | 06171638 A | 6/1994 |
| JP | H06255052 A | 9/1994 |
| JP | H07186190 A | 7/1995 |
| JP | H07205195 A | 8/1995 |
| JP | H08156202 A | 6/1996 |
| JP | 2970292 B2 | 11/1999 |
| JP | 3134376 B2 | 2/2001 |
| JP | 2002104362 A | 4/2002 |
| JP | 2004203906 A | 7/2004 |
| JP | 2005219760 A | 8/2005 |
| JP | 2005308567 A | 11/2005 |
| JP | 2006168250 A | 6/2006 |
| JP | 2006306470 A | 11/2006 |
| JP | 2006312485 A | 11/2006 |
| JP | 2007223628 A | 6/2007 |
| JP | 2007186190 A | 7/2007 |
| JP | 2007205195 A | 8/2007 |
| JP | 2008156202 A | 7/2008 |
| JP | 2008189314 A | 8/2008 |
| JP | 2008208288 A | 9/2008 |
| JP | 2009062059 A | 3/2009 |
| JP | 4674136 B2 | 1/2011 |

(56) References Cited

FOREIGN PATENT DOCUMENTS

| | | |
|---|---|---|
| JP | 5029879 B2 | 9/2012 |
| JP | 2013028137 A | 2/2013 |
| JP | 2015131438 A | 7/2015 |
| JP | 2015131492 A | 7/2015 |
| JP | 3207320 U | 10/2016 |
| JP | 2017036069 A | 2/2017 |
| JP | 2017128659 A | 7/2017 |
| JP | 2018039536 A | 3/2018 |
| JP | 2018058604 A | 4/2018 |
| JP | 6593187 B2 | 10/2019 |
| KR | 20010047311 A | 6/2001 |
| TW | 201704107 A | 2/2017 |
| TW | 201704108 A | 2/2017 |
| TW | 201706189 A | 2/2017 |
| WO | 2006127569 A2 | 11/2006 |
| WO | 2007065508 A2 | 6/2007 |
| WO | WO2007066508 A1 | 6/2007 |
| WO | 2007098837 A1 | 9/2007 |
| WO | WO2016031150 A1 | 3/2016 |
| WO | 2017134099 A1 | 8/2017 |
| WO | 2019133713 A1 | 7/2019 |
| WO | 2020081114 A1 | 4/2020 |

OTHER PUBLICATIONS

All final and non-final office actions for U.S. Appl. No. 16/158,841.
All final and non-final office actions for U.S. Appl. No. 16/158,719.
C-Mold Co-Injection, Chapter 20, Copyright 1996 Advanced CAE Technology, Inc.
European Search Report for 17196087.5 dated Mar. 29, 2018.
PCT International Search Report and Written Opinion for PCT/US2018/053683 dated Feb. 15, 2019.
The Preferential Heating process for PET flat or asymmetric containers on SBO Universal and SBO Compact blow molders, www.sidel.com, publication date unknown.
PCT Search Report and Written Opinion for PCT/US2019/026939 dated Jul. 15, 2019.
All final and non-final office actions for U.S. Appl. No. 16/845,283.
All final and non-final office actions for U.S. Appl. No. 16/845,295.
All Office Actions, U.S. Appl. No. 17/144,281.
All Office Actions, U.S. Appl. No. 17/217,751.
All Office Actions, U.S. Appl. No. 17/226,203.
All Office Actions, U.S. Appl. No. 17/320,569.
Unpublished U.S. Appl. No. 17/226,203, filed Apr. 9, 2021, to Marc Andrew Mamak et al.

* cited by examiner

BLOW MOLDED ARTICLE WITH DEBOSSING

FIELD OF THE INVENTION

The invention is generally directed to a blow molded article with a deboss element on the outer surface of the article, and more particularly to blow molded, multilayer articles having a layer with an effect pigment that is visible through a transparent outer surface that has a debossed element with a texture.

BACKGROUND OF THE INVENTION

Consumers want to purchase articles, particularly hair and beauty products in blow molded containers that grab their attention by having a unique and/or premium appearance at the store shelf, webpage, and/or app. During use, it is important the consumer continues to be impressed by not only the article's appearance, but the function, feel, and integrity of the article.

To make eye-catching articles that connote luxury and quality, it can be desirable for the article to have a noticeable debossed element. Within this element, it can be particularly attractive if the debossed element can have a markedly different surface texture than the other portions of the article. For instance, the bottle can have a glossy visual appearance with a high degree of light reflected from that surface and a debossed element can have a rough texture and matte visual appearance. Additionally, a region of curvature by the deboss element can provide a feature of contrast which can include a change in lightness or flop, chromaticity, sparkle, pearlescence or the like. The difference in texture and region of curvature can help the debossed article stand out to consumers at the store shelf or web page.

However, current injection stretch blow molding (ISBM) processes do not create articles with noticeable debossing. Instead, there is little difference between the article and the debossed element, causing the debossing to be difficult to discern, especially at a distance.

As such, there remains a need for a blow molded article with high gloss and a noticeable debossed element.

SUMMARY OF THE INVENTION

A blow molded multilayer article with a hollow body defined by a wall comprising at least three layers, a first Layer A comprising an outer surface of the wall, a second Layer A comprising the inner surface of the wall in that region and a Layer B between the first and second Layer As; wherein the first and second Layer A are transparent and optionally comprise a colored dye or pigment; wherein the Layer B comprises an effect pigment and/or an opacifying pigment; wherein the A-layers and B-layers comprise a thermoplastic resin; wherein the wall comprises a deboss element and a non-deboss area; wherein the wall at the non-deboss element comprises a thickness; wherein the wall at the deboss element comprises a thickness and wherein the thickness of the deboss element is greater than the thickness of the non-deboss area.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

While the specification concludes with claims particularly pointing out and distinctly claiming the invention, it is believed that the present disclosure will be better understood from the following description.

Figure 1A:
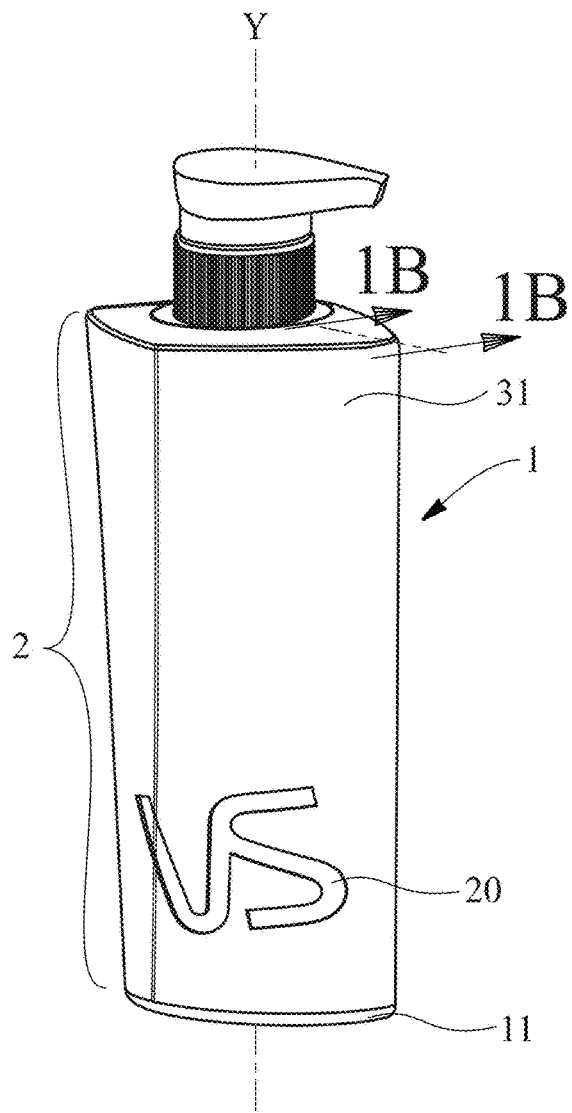
FIG. 1A is a front view of an article with an appearance (color and gloss) and deboss element.

The eye-catching articles with a debossed area can be blow molded articles having a hollow body, such as containers and bottles, and can be made via a process of injection stretch blow molding (ISBM). FIG. 1A is a front view of an article 1, in this instance a bottle, with a debossed element 20. The processed described herein can also be used to create articles with embossed elements.

The blow molded articles can have walls defining the hollow body of the article. The walls can include multiple layers that are formed without adhesives by ISBM. The walls can include A-layers, which can be transparent and colored, and one or more B-layers, which can include effect pigments. Article 1 can appear opaque across the entire volume since across the entire article the wall contains at least one layer with an effect pigment and/or other pigment(s).

The configuration of A-layers that are transparent and B-layers that contain effect pigments can lead to articles with high gloss, brilliant colors, and even a sparkly, metallic, iridescent, and/or pearlescent quality Effect pigments can work well when applied onto a solid surface because their platelet like particles spontaneously orient in a direction parallel to the surface on which they are applied, in cases where the article-making process involves shear, which is applied in a direction that is coplanar to the surface of the article. It has been surprisingly found that, in the multilayer articles described herein, the effect pigment particles in the B-layer can be predominantly oriented so that their face is parallel to the surface of the article to a higher degree than for monolayer articles.

The outer surface, generally a transparent A-layer, can include the debossed element. Thus, the surface roughness that can accompany the debossing is not in contact with the effect pigments, which can make the debossing more noticeable at a distance. Articles created with transparent A-layers and B-layers that contain pigments including effect pigments and/or opacifying pigments can result in an article with high gloss and low reflected haze. The introduction of surface roughness via debossing thus creates a unique visual effect due to the juxtaposition of high gloss in the non-debossed area and matte within the debossed element.

The article can also include one or more debossed elements. The debossed element can be visually perceptible by a person viewing the exterior surface of the article. In addition, the debossed element can be felt when a person touches the article, for instance with his/her fingers.

Figure 2B:
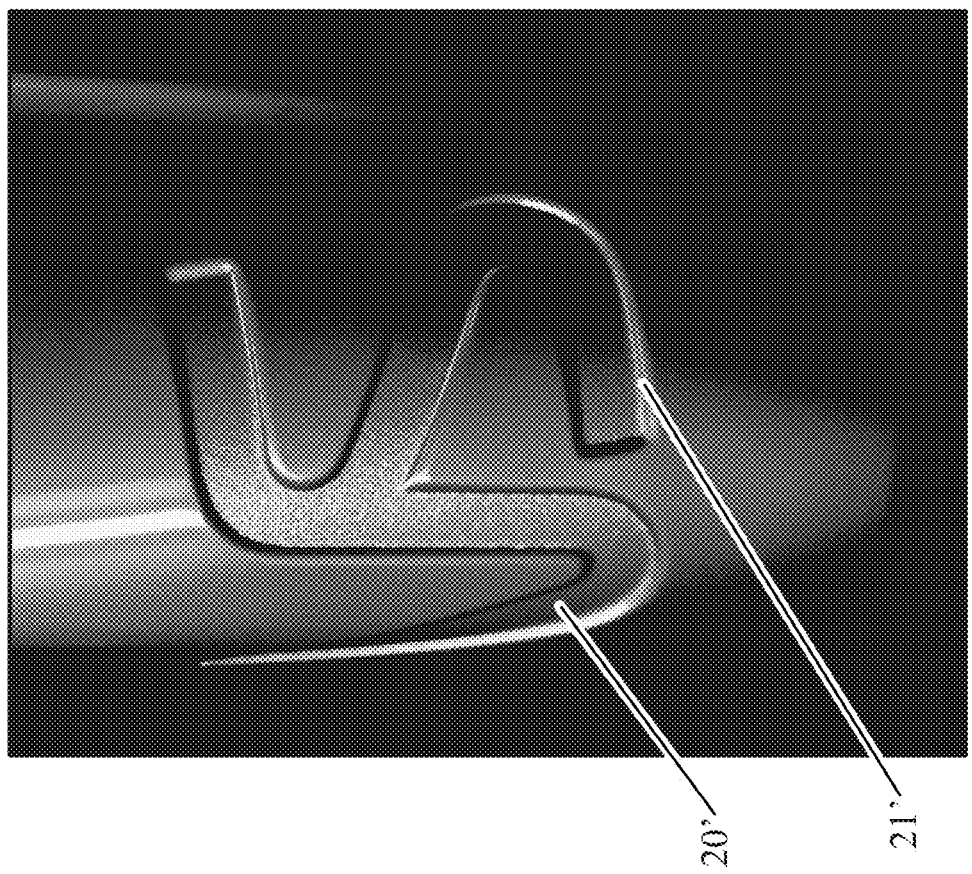
FIG. 2B is a photograph of a debossed element on a multilayer bottle with effect pigments.
Figure 2A:
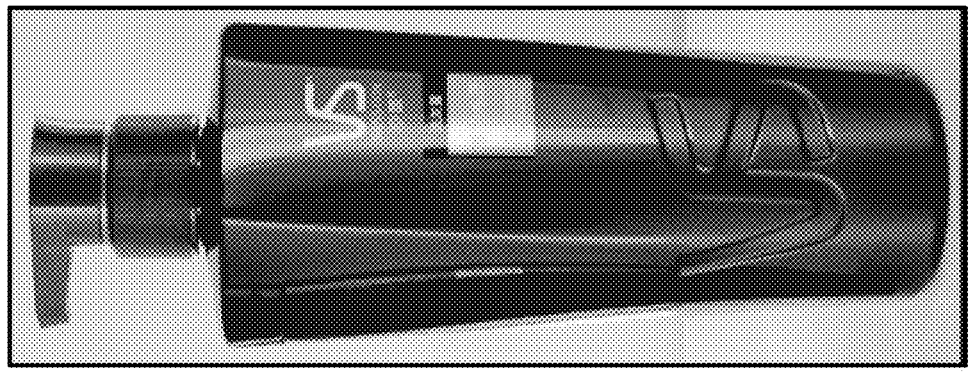
FIG. 2A is a photograph of a multilayer bottle with effect pigments and a debossed element.

FIG. 2A is a photograph of a multilayer bottle with a debossed element. The bottle in FIG. 2 is exceptionally glossy and the effect pigments, visible through the outer layer, give the surface of the article a sparkly or metallic appearance or an appearance of depth. FIG. 2A also includes a debossed element that can be visually perceptible by a person viewing the exterior surface of the article from a distance (e.g. a store shelf). The debossed element is not only stamped into the surface but can have a different texture as compared to the glossy bottle.

FIG. 2B is a photograph of a debossed element on a multilayer bottle. The debossed element 20' has a texture that appears matte, especially in comparison to the high gloss area of the non-debossed area of the bottle. FIG. 2B also shows curvature 21 that can provide a feature of contrast including a change in lightness or flop, chromaticity, sparkle, pearlescence or the like. Curvature 21' is especially pronounced in the photograph in FIG. 2B because of the layer with the effect pigments is underneath a transparent outer layer.

The articles described herein can be blow molded articles made via a process of ISBM. The ISBM process starts with a first step where a thermoplastic material, typically a thermoplastic resin, is melted and then injected into a preform mold, so to form a preform. The preform mold can have an embossed area that is stamped out in relief with a height of about 0.05 mm to about 1.2 mm. In instances where the article has an embossed area, the preform has an area that is debossed with a depth of about 0.05 mm to about 1.2 mm. In some instances, the preform can have multiple layers where the layer forming the outer surface is transparent and thicker than the layer forming the inner surface. When the preform is then released from the preform mold, the preform is cooled. In the ISBM process, the preform is reheated by using profiled and/or preferential heating to ensure that the preform expands in predefined directions and takes the specific shape of the mold's cavity, particularly at the emboss/deboss element. With the preform held at the neck, air pressure, and usually, a stretch rod is used to stretch the preform in the axial direction, and optionally also in the radial direction. In the case of bottles, the neck portion of the article can contain threads or flanges suitable for a closure and are typically unchanged with respect to the preform as the neck part is often not stretched. The articles obtained by injection stretch blow-molding can be significantly longer than the preform.

Ultimately, this can lead to an article with an debossed area with a high degree of contrast between the article and the rough debossed element. The debossed element can be "visually perceptible" to a viewer. By "visually perceptible" is meant that a human viewer can visually discern the debossed element with the unaided eye (excepting standard corrective lenses adapted to compensate for near-sightedness, farsightedness, or stigmatism, or other corrected vision) in lighting at least equal to the illumination of a standard 100-watt incandescent white light bulb at a distance of 1 meter.

As used herein, "article" refers to an individual blow molded hollow object for consumer usage, e.g. a container suitable for containing compositions. Non-limiting examples can include a bottle, a jar, a cup, a cap, a vial, a tottle, a tube, and the like. The article can be used in storage, packaging, transport/shipping, and/or for dispensing compositions container therein. Non-limiting volumes containable within the container are from about 10 mL to about 1500 mL, about 100 ml to about 900 mL, from about 200 mL to about 860 mL, from about 260 mL to about 760 mL, from about 280 mL to about 720 mL, from about 350 mL to about 500 mL. Alternatively, the container can have a volume up to 5 L or up to 20 L.

The compositions contained in the article may be any of a variety of compositions and including detergents (such as laundry or dishwashing detergents), fabric softeners and fragrance enhancers (such as Downy® Fresh Protect) food products including but not limited to liquid beverages and snacks, paper products (e.g., tissues, wipes), beauty care compositions (e.g., cosmetics, lotions, shampoos, conditioners, hair styling, deodorants and antiperspirants, and personal cleansing including washing, cleaning, cleansing, and/or exfoliating of the skin, including the face, hands, scalp, and body), oral care products (e.g., tooth paste, mouth wash, dental floss), medicines (antipyretics, analgesics, nasal decongestants, antihistamines, cough suppressants, supplements, anti-diarrheal, proton pump inhibitor and other heartburn remedies, anti-nausea, etc.) and the like. The compositions can include many forms, non-limiting examples of forms can include liquids, gels, powders, beads, solid bars, pacs (e.g. Tide PODS®), flakes, paste, tablets, capsules, ointments, filaments, fibers, and/or sheets (including paper sheets like toilet paper, facial tissues, and wipes).

The article can be a bottle for holding a product, for instance a liquid product like shampoo and/or conditioner.

As used herein, the term "blow molding" refers to a manufacturing process by which hollow plastic articles containing cavities, suitable to accommodate compositions are formed. Generally, there are three main types of blow molding: extrusion blow molding (EBM), injection blow molding (IBM) and molding injection stretch blow molding (ISBM).

As used herein, the term "color" includes any color, such as, e.g., white, black, red, orange, yellow, green, blue, violet, brown, and/or any other color, or declinations thereof.

As used herein, the term "effect pigments" are marketed as such by the major pigments suppliers such as Merck® or BASF®. Effect pigments can include "metal effect pigments" and "special effect pigments." Metal effect pigments can comprise metallic cores such as aluminum. They can create a metal-like luster by reflection of light at the surface of the metal platelets when they have parallel alignment in their application system. Metal effect pigments can include metal platelets coated with inorganic oxides such as silica, titanium dioxide, iron oxide, and other oxides. Special effect pigments include all other platelet-like effect pigments which cannot be classified as "metal effect pigments." These are typically based on a substrate which has platelet shaped crystals (or particles) such as mica, (natural or synthetic) borosilicate glass, alumina flakes, and/or silica flakes. These platelet shaped particles are typically coated with oxides. In some examples, the special effect pigments can be "pearlescent pigments" (also referred to as "pearl luster pigments"). Also suitable are "interference pigments." Interference pigments are defined as special effect pigments whose color is generated completely or predominantly by the phenomenon of interference of light.

As used herein, "opaque" means that layer has total luminous transmittance of less than 50%. The total luminous transmittance is measured in accordance with ASTM D1003.

As used herein, "preform" is a unit that has been subjected to preliminary, usually incomplete, shaping or molding, and is normally further processed to form an article. The preform is usually approximately "test-tube" shaped.

As used herein, "substantially free" means less than 3%, alternatively less than 2%, alternatively less than 1%, alternatively less than 0.5%, alternatively less than 0.25%, alternatively less than 0.1%, alternatively less than 0.05%, alternatively less than 0.01%, alternatively less than 0.001%, and/or alternatively free of.

As used herein, "transparent" means that the layer has total luminous transmittance of 50% or more and reflected haze of less than 5 haze units. The total luminous transmittance is measured in accordance with ASTM D1003, the reflected haze is measured in accordance with ASTM E430.

As used herein, the terms "include," "includes," and "including," are meant to be non-limiting and are understood to mean "comprise," "comprises," and "comprising," respectively.

All percentages, parts and ratios are based upon the total weight of the compositions of the present invention, unless otherwise specified. All such weights as they pertain to listed ingredients are based on the active level and, therefore, do not include carriers or by-products that may be included in commercially available materials.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Where amount ranges are given, these are to be understood as being the total amount of said ingredient in the composition, or where more than one species fall within the scope of the ingredient definition, the total amount of all ingredients fitting that definition, in the composition. For example, if the composition comprises from 1% to 5% fatty alcohol, then a composition comprising 2% stearyl alcohol and 1% cetyl alcohol and no other fatty alcohol, would fall within this scope.

FIG. 1A is a perspective view of an article 1 with a debossed element 20. The article 1 has a body 2 and a neck having screw thread notches, snap ring, or other connector on the outer surface and an orifice, an opening leading to the hollow body of the article. The body has base 11 at the lower end and shoulder 31 at the upper end. The non-debossed area is anywhere on the body that does not include the debossed element and the base.

Figure 1B:
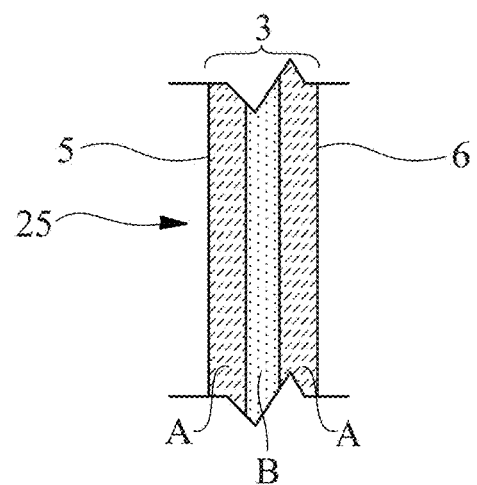
FIG. 1B is an enlarged schematic cross-section along axis-y.

FIG. 1B is schematic of an enlarged cross section along axis-y of FIG. 1A. A hollow body 25 defined by wall 3 having an inner surface 5 and an outer surface 6 and can be formed without adhesives (or substantially free of adhesives) by ISBM. The structure in FIG. 1B has at least three layers: one B-layer (B) between two A-layers (A).

The B-layers can include an effect pigment and/or an opacifying pigment.

The A-layer can be transparent and can include a pigment or soluble dye. The pigment or dye can be colored. Alternatively, the A-layer can be colorless. The A-layer can be free of or substantially free of pigments and/or of particles having their largest dimension greater than about 150 nm or between about 150 nm and 5000 nm.

Alternatively, the A-layer can include a pigment, the A-layer can still be transparent because the pigments can be in a matrix where the difference between the refractive index of the pigment (which depends on wavelength) and that of the matrix is low, and when the particle size of the pigment is below that which Mie scattering occurs (typically a largest particle dimension of about 100 nm or less). The A-layer can contain opaque absorption pigments and still be transparent, if the content of the layer in opaque absorption pigments is sufficiently small.

In one example, the outer layer that includes the debossed element can include pigments and/or effect pigments. In another example, the article can have a color gradient, such as an axial color gradient, or other surface ornamentation that can contain effect pigments.

In FIG. 1A, an A-layer forms the outer surface of the wall. A transparent A-layer can give the article an appearance of increased gloss and chroma and an impression of depth, as compared to articles with a different configuration, including monolayer articles.

The average panel wall thickness of the non-debossed area can be from about 150 μm to about 7 mm, alternatively from about 200 μm to about 5 mm, alternatively from about 250 μm to about 2.5 mm, from about 250 μm to about 2 mm, alternatively from about 300 μm to about 1.5 mm, alternatively from about 350 μm to about 1 mm, alternatively from about 375 μm to about 750 μm, alternatively from about 400 μm to about 600 μm, alternatively from about 450 μm to about 550 μm, and alternatively from about 460 μm to about 495 μm. The average panel wall thickness can be determined using the Local Wall Thickness method, described herein. The average local wall thickness of the non-debossed area can vary by less than 20% across the volume, alternatively less than 15%, alternatively less than 10%, and alternatively less than 10%.

The average panel wall thickness of the debossed element can be greater than the average panel wall thickness of the non-debossed area. The average panel wall thickness of the debossed element can be from about from about 250 μm to about 2 mm, alternatively from about 300 μm to about 1.5 mm, alternatively from about 350 μm to about 1 mm, alternatively from about 375 μm to about 750 μm, alternatively from about 400 μm to about 600 μm, alternatively from about 450 μm to about 575 μm, and alternatively from about 485 μm to about 550 μm. The average panel wall thickness can be determined using the Local Wall Thickness method, described herein.

In the non-debossed area and the debossed element Layer A that comprises the outer surface of the article can be thicker than the other layers. The thickness of Layer A in the debossed element can be greater than the thickness of the non-debossed area. The thickness of Layer A in the debossed element can be at least 5 μm greater the thickness in the non-debossed area, alternatively at least 10 μm greater, alternatively at least 15 μm greater, alternatively at least 20 μm greater, alternatively at least 25 μm greater, and alternatively at least 30 μm greater. The thickness of Layer A in the debossed element can be from about 10 μm to about 90 μm larger than the thickness in the non-debossed area, alternatively from about 20 μm to about 60 μm larger, alternatively 25 μm to about 50 μm larger, and alternatively from about 30 μm to about 40 μm larger. The thickness of Layer A in the non-debossed area can be from about 100 μm to about 500 μm, alternatively from about 150 μm to about 400 μm, alternatively from about 175 μm to about 350 μm, alternatively from about 190 μm to about 300 μm, alternatively from about 200 μm to about 290 μm, and alternatively from about 225 μm to about 275 μm. The thickness of Layer A in the debossed element can be from about 100 μm to about 500 μm, alternatively from about 150 μm to about 400 μm, alternatively from about 180 μm to about 350 μm, alternatively from about 190 μm to about 325 μm. In the non-debossed area and the debossed thickness of Layer A can be about 30% to about 77% of the entire wall thickness, alternatively from about 35% to about 70%, alternatively from about 40% to about 70%, alternatively from about 45% to about 67%, alternatively from about 50% to about 65%, and alternatively from about 53% to about 62%. The thickness of Layer A can be determined using the Micro-CT Method for Layer Thickness, described herein.

In the non-debossed area and the debossed Layer B (e.g. layer containing effect pigments) can have a thickness from about 20 μm to about 300 μm, alternatively from about 40 μm to about 250 μm, alternatively from about 50 μm to about 200 μm, alternatively from about 55 μm to about 175 μm, alternatively from about 60 μm to about 170 μm, alternatively from about 65 μm to about 150 μm, and alternatively from about 70 μm to about 125 μm. In the non-debossed area and the debossed thickness of Layer B can be about 10% to about 35% of the entire wall thickness, alternatively from about 12% to about 33%, alternatively from about 13% to about 27%, alternatively from about 13% to about 25%, alternatively from about 14% to about 20%, and alternatively from about 15% to about 19%. In one example, the thickness of Layer B can vary less than 20% between the debossed element and areas about 1 mm from the outer edges of the debossed element, alternatively less than 15%, alternatively less than 10%, alternatively less than 5%, and alternatively the thickness is approximately the same. The thickness of Layer B can be determined using the Micro-CT Method for Layer Thickness, described herein.

The articles can appear opaque, as visually perceptible by a person. Although the article can appear opaque, the opacity can vary across the bottle as measured by the Opacity Test Method, described herein.

The % opacity can be from about 55% to about 100%, alternatively from about 60% to about 98%, and alternatively from about 65% to about 97%. The % opacity can be from about 70% to about 100%, alternatively from about 72% to about 99%, and alternatively from about 74% to about 97%, and alternatively from about 80% to about 96%. The % opacity can be greater than 50%, greater than 60%, greater than 70%, greater than 75%, greater than 80%, greater than 85%, and greater than 90%. Opacity is measured according to the Opacity Test Method, described herein.

The % change in opacity from the opaquest area to the least opaque area can be less than 30%, alternatively less than 25%, alternatively less than 22%, and alternatively less than 20%. The opacity can vary across the gradient, for instance the article can have a greater % opacity in the glossy region than in the matte region, according to the Opacity Test Method.

The article can have a location on the outer surface of the non-debossed area with a haze of ≤30, alternatively ≤20, alternatively ≤15, alternatively ≤10, alternatively ≤5, alternatively ≤3, and alternatively ≤2. The article can have a location on the outer surface of the non-debossed area with a haze of from about 0 to about 30, alternatively about 0 to about 20, alternatively about 0.5 to about 15, alternatively about 0.8 to about 10, and alternatively about 1 to about 5. The haze can be determined by the Haze and Reflection Method, described hereafter.

The article can have a location on the outer surface of the non-debossed area with a haze anisotropy of <1, alternatively ≤0.9, alternatively ≤0.8, alternatively ≤0.7, and alternatively ≤0.6. The haze can be determined by the Haze and Reflection Method, described hereafter.

At least 30%, alternatively at least 40%, alternatively at least 50%, alternatively at least 60%, alternatively at least 70%, alternatively at least 80%, and alternatively at least 90% of the non-debossed area can have a 20° gloss of greater than or equal to 65 GUs, greater than or equal to 68 GUs, greater than or equal to 70 GUs, greater than or equal to 71 GUs, greater than or equal to 73 GUs, greater than or equal to 75 GUs, greater than or equal to 80 GUs, greater than or equal to 85 GUs, greater than or equal to 90 GUs, and/or greater than or equal to 95 GUs. To determine the % of the non-debossed area has the 20° gloss specified in this paragraph, a vertical line is chosen across the sample (from the side that was originally closest to the shoulder to the side that was originally closest to the base), 10 measurements are taken according to the Gloss 20° Method, the measurements are equally spaced apart along the line, and it is confirmed how many of them have the required gloss units.

A location of the non-debossed area 1 mm from the curvature of the debossed element can have a gloss 20° of from about 50 to about 125 GUs, from about 60 GUs to about 120 GUs, from about 70 to about 115 GUs, and/or from about 80 GUs to about 110 GUs. The gloss 20° can be measured according to the Gloss 20° Method, described herein.

At least 30%, alternatively at least 40%, alternatively at least 50%, alternatively at least 60%, alternatively at least 70%, alternatively at least 80%, and alternatively at least 90% of the non-debossed area can have an average surface roughness of ≤1 μm, alternatively ≤0.5 μm, alternatively ≤0.25 μm, and alternatively ≤0.1 μm. The surface roughness can be determined with the Surface Roughness Measurement Test Method, described herein.

The debossed element can have a location on the surface (not on the curvature) with a gloss 20° of less than or equal to 60, less than or equal to 50, less than or equal to 40, less than or equal to 30, less than or equal to 15, less than or equal to 12, less than or equal to 10, less than or equal to 8, and/or less than or equal to 5. The gloss 20° can be measured according to the Gloss 20° Method, described herein.

The debossed element can have a location on the outer surface (not on the curvature) with a surface roughness of ≥0.5 μm, alternatively ≥0.75 μm, alternatively ≥1 μm, alternatively ≥2 µm, and alternatively ≥2.5 µm. The surface roughness can be determined with the Surface Roughness Measurement Test Method, described herein.

The roughness ratio of the bottle (Ra debossed element/Ra non-debossed area) can be ≥15, alternatively ≥25, alternatively ≥35, alternatively ≥40, alternatively ≥45, and/or alternatively ≥50. The roughness ratio of the bottle can be from about 15 to about 100, alternatively from about 20 to about 90, alternatively from about 30 to about 80, alternatively from about 40 to about 75, alternatively from about 45 to about 65, and alternatively from about 50 to about 60.

Furthermore, the articles described herein are less susceptible to delamination as compared to other articles, including monolayer and other multilayer articles. Delamination is a constant problem in manufacturing blow molded multilayer hollow articles, such as bottles and containers. Delamination can occur immediately or over time due to the mechanical handling of the container, to thermal stress or mechanical stress. Delamination can be particularly problematic in articles with debossing, as the debossing process may cause the layers to separate. Delamination can manifest as bubbles (which is actually the separation of the two layers at the interface which can see by a bubble-like appearance) visible through the article surface but can also be at the origin of container failure.

Without being bound by theory, we believe that the parallel flow co-injection, due to a prolonged contact of the materials of the various layers still in molten or partially molten state, leads to the formation of an interface region between the layers wherein the layers are slightly interpenetrated. The interface region generates a good adhesion between the layers and thus makes it much more difficult to separate them. Delamination resistance is evaluated measuring the Critical Normal Load, as described herein. A higher Critical Normal Load indicates a higher delamination resistance.

The articles can have a critical normal load of greater than or equal to 50 N, greater than or equal to 70 N, 90 N, greater than or equal to 95 N, greater than or equal to 100 N, greater than or equal to 104 N, greater than or equal to 105 N, greater than or equal to 110 N, and/or greater than or equal to 120 N. The articles can have a critical normal load of from about 90 N to about 170 N, alternatively from about 95 N to about 160 N, alternatively from about 100 N to about 155 N, and alternatively from about 104 N to about 145 N. The critical normal load can be measured by the Critical Normal Load, using the method described herein.

The article may comprise more than 50 wt. %, preferably more than 70% wt., more preferably more than 80% wt, even more preferably more than 90% wt. of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP), polymethylpentene (PMP), liquid crystalline polymer (LCP), cyclic olefin copolymer (COC), and a combination thereof. Preferably, the thermoplastic resin is selected from the group consisting of PET, HDPE, LDPE, PP, PVC, PETG, PEN, PS, and a combination thereof. In one example, the thermoplastic resin can be PET.

Recycled thermoplastic materials may also be used, e.g., post-consumer recycled polyethylene terephthalate (PCR-PET); post-industrial recycled polyethylene terephthalate (PIRPET); regrind polyethylene terephthalate.

The thermoplastic materials described herein may be formed by using a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin used herein could have relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials. Therefore, in an alternative embodiment, the article is substantially free of the expensive metallocene thermoplastic materials.

The A-layers and B-layers can be based on the same type of thermoplastic resin (e.g. PET). This can allow a better interpenetration of the layers at the interface due to their chemical compatibility and a more robust wall. For "based on the same type of resin" it is meant that the A-layers and B-layers can contain at least 50%, at least 70%, at least 90%, and/or at least 95% of the same type of resin. For "same type" of resin it is intended resin from the same chemical class i.e. PET is considered a single chemical class. For example, two different PET resins with different molecular weight are considered to be of the same type. However, one PET and one PP resin are NOT considered of the same type. Different polyesters are also not considered of the same type.

The A-layers and B-layers may be formed by the same thermoplastic resin (e.g. PET) and may be different only for the type of colorants and pigments (including effect pigments and/or colored pigments) added.

The articles can comprise one or more sub-layers with various functionalities. For instance, an article may have a barrier material sub-layer or a recycled material sub-layer between an outer thermoplastic layer and an inner thermoplastic layer. Such layered containers can be made from multiple layer preforms according to common technologies used in the thermoplastic manufacturing field. Since barrier material sub-layers and recycled material sublayers can be used in the A-layers (particularly when they do not impact transparency of the A-layers) or B-layer or an additional C-layer.

The article can contain, in any of its layers as long as the required properties of the layer are maintained, additives typically in an amount of from about 0.0001% to about 9%, from about 0.001% to about 5%, and/or from about 0.01% to about 1%, by weight of the article. Non-limiting examples of the additives can include filler, cure agent, anti-statics, lubricant, UV stabilizer, anti-oxidant, anti-block agent, catalyst stabilizer, nucleating agent, and a combination thereof.

Gradients and/or additional visual effects can be created. For example, the A-layer or the B-layer can contain black and/or colored absorption pigments.

The A-layer can also include effect pigments, including effect pigments that are small enough and/or a small enough quantify so the A-layer still appears transparent or at least substantially transparent. For instance, the A-layer can contain a relatively small content of effect pigment having small particle size or an even smaller content of effect pigment having large particles (e.g. to produce a sparkle effect).

The B-Layer can contain opacifying pigments (in addition to or instead of effect pigments). Opacifying pigments can include opacifiers, opaque absorption pigments, and combinations thereof.

Non-limiting examples of opacifiers can include titanium dioxide, calcium carbonate, silica, mica, clays, minerals and combinations thereof. Opacifiers can be any domain/particle with suitably different refractive index from the Thermoplastic Materials (e.g. PET, which can include poly(methyl methacrylate), silicone, liquid crystalline polymer (LCP), polymethylpentene (PMP), air, gases, etc.). Additionally, opacifiers can have the appearance of being white due to scattering of light or black due to absorption of light as well as shades in between as long as they block the majority of light from being transmitted to the layer underneath. Non-limiting examples of black opacifying pigments include carbon black and organic black pigments such as Paliogen® Black L 0086 (BASF).

Opaque absorption pigments can include particles that provide color and opacity to the material in which they are present. Opaque absorption pigments can be inorganic or organic particulate materials. All absorption pigments can be opaque if their average particle size is sufficiently large, typically larger than 100 nm, alternatively larger than 500 nm, alternatively larger than 1 micrometer, and alternatively larger than 5 micrometers. Absorption pigments can be organic pigments and/or inorganic pigments. Non-limiting examples of organic absorption pigments can include azo and diazo pigments such as azo and diazo lake, Hansas, benzimidazolones, diarylides, pyrazolones, yellows and reds; polycyclic pigments such as phthalocyanines, quinacridones, perylenes, perinones, dioxazines, anthraquinones, isoindolins, thioindigo, diaryl or quinophthalone pigment, Aniline Black, and combinations thereof. Non-limiting examples of inorganic pigments can include titanium yellow, iron oxide, ultramarine blue, cobalt blue, chromic oxide green, Lead Yellow, cadmium yellow and cadmium red, carbon black pigments, and combinations thereof. The organic and inorganic pigments can be used singly or in combination.

Controlling the layer arrangement and the components in the A and B-layers can help to create a unique color profile and transparency to achieve different visual effects, ultimately creating an eye-catching premium appearance. For instance, the A-layers can be transparent and colored, and the B-layer can have silver pearl effect pigment. Alternatively, the A-layers can be opaque and black and combined with B-layers, having an effect pigment which generates an interference color, a gradient blow molded article can be achieved with a gradient from black to intense interference color.

The A-Layers and B-layers can comprise similar resins such as identical grades of PET, dissimilar grades of PET, or virgin PET/recycled PET (rPET). The use of r-PET is desirable due to decreased cost and sustainability reasons. The A-Layers and B-Layers can also comprise different resins which can alternate within the article such as PET/cyclic olefin copolymer, PET/PEN, or PET/LCP. The resin pair is chosen to have optimal properties such as appearance, mechanical, and gas and/or vapor barrier.

Process for Making Articles

The articles can be made according to the ISBM process described herein. Articles made using ISBM process (as well as their respective preforms made via injection molding) can be distinguished from similar articles made using different process e.g. extrusion blow molding, for the presence of a gate mark, i.e. a small raised dot which indicates the "gate" where the injection took place. Typically, in the case of container and bottles, the "gate mark" is present at the bottom of the article.

The ISBM process starts with making a preform. The preform can be molded by parallel co-injection process.

First blends for Stream I and Stream II are made. The blend for Stream I can contain at least a thermoplastic resin and optionally a dye. The blend for Stream II can contain at least thermoplastic resin and pigment, which can include effect pigments. The ratio of each stream can be independently gravimetrically controlled. The ratio of Stream I to Stream II can be about 2:1. The ratio could also be slightly above or below 2:1 and still acceptable results.

The raw materials for Stream I and Stream II are dried prior to processing. In some examples, a dehumidifying drier dries the streams at about 80° C. to about 160° C. for approximately 4-8 hours with a conical hopper desiccant canister type such as available from Plastic Process Equipment, Inc. (PPE). The dryer can be operated under vacuum conditions until the blow mold blend is dried to less than 0.01% moisture content, and alternatively less than 0.005% moisture content.

The dried Stream I and Stream II blends can be fed in a parallel manner from their respective hopper, barrel, & hot-runner channel until they meet within and at the exit of the nozzle. Prior to this, the Stream I and Stream II blends can be contained in independent hoppers before being fed into two conventional and separate plasticizing screw extruders (single-screw design) where each stream of hot polymer melt can be formed. Streams I and Stream II can then be fed (separately) into a single valve-gate hot runner system (such as available from Milacron®) with two separate channels (A & B).

The two uniformed streams of hot polymer melt join at the injector nozzle(s) prior to entering the mold cavity and this starts the multi-stream co-joined flow. The injectors can be arranged in a number of different ways including the arrangements shown in FIGS. 3A-C.

Figure 3A:
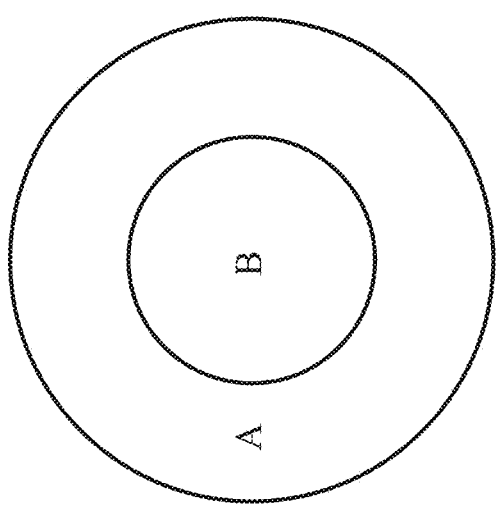
FIG. 3A is a schematic of an injector arrangement where the nozzles are concentric.

The injector nozzle arrangement of FIG. 3A can result in two concentric streams of the melted thermoplastic components that result from the concentric nozzles B and A. The outer nozzle A can dispense stream I, which can include a thermoplastic composition that eventually forms the transparent outside layer A of the article and the inside layer A, as shown in enlarged schematic cross-section in FIG. 1B. The inner nozzle B, corresponds to stream II, which can include a melted combination of thermoplastic resin and effect pigment that eventually forms the pigmented layer B of the article, as shown in the enlarged schematic cross-section in FIG. 1B.

Figure 3B:
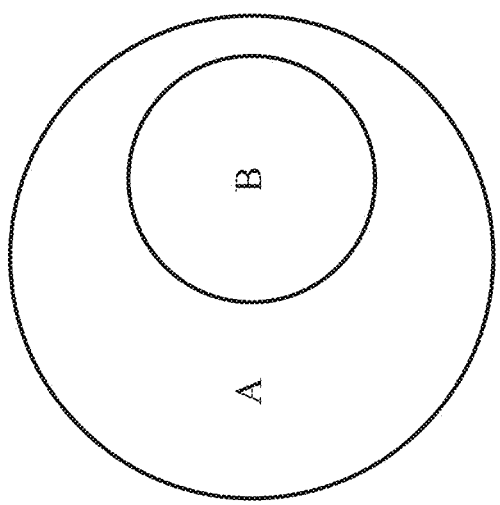
FIG. 3B is a schematic cross-section of an injector arrangement that are off-centered.
Figure 3C:
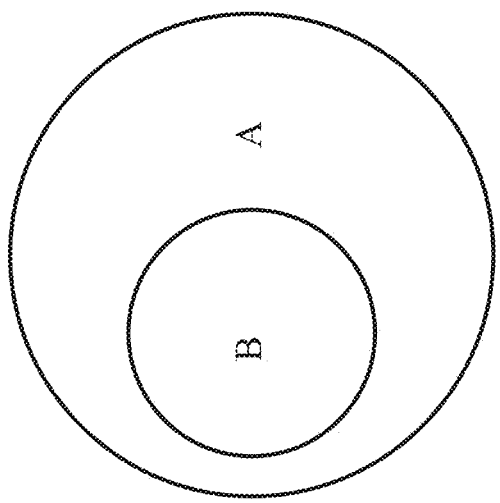
FIG. 3C is a schematic cross-section of an injector arrangement that are off-centered.

Different nozzle arrangements can result in different flow patterns of streams I and II. FIGS. 3B and 3C show an injector nozzles A and B that are off-centered (non-concentric or biased). The outer nozzle A can dispense stream I and the inner nozzle B can dispense stream II. In FIG. 3B, the placement of the injector nozzle A can enable a thicker A layer that comprises the outer surface of the bottle, which comprises the outer surface of the article. In FIG., 3C, the placement of the injector nozzle A can enable a thinner A layer that comprises the outer surface of the bottle and a thicker B layer, which comprises the inner surface of the article. To obtain this stream pattern, several methods can be utilized. Processes with non-concentric nozzles require the center nozzle to be positioned off-center, while processes with valve pin plates would adjust the profile creating the offset preferential flow. The biased position in FIG. 3B can allow for more A material to flow to the outside of the preform, which can result in improved visual effects of the article, in particular improved appearance of the debossed element.

A single-cavity preform mold ran on a Fanuc Roboshot S-2000i275B injection molding machine can be used to make performs from the molten discharge at a barrel temperature of about 270-310° C. for both Steams I and II, screw speed of about 75 rpm (about 50 to about 100 rpm) for Stream I and about 60 rpm (about 60 to about 100 rpm) for Stream II, molding pressure of about 6,500 psi for Stream I and about 18,000 psi for Stream II, backpressure of about 700 to 800 psi for both Stream I and Stream II, cycle time of about 50 seconds, and a part mold size of about 54.5 grams with mold cooling at about 13° C.

The preform can be ejected from the mold and can be allowed to cool at ambient conditions after Injection Molding before it can be placed in a 2-stage re-heat Stretch Blow Molding (SBM) machine, like a Sidel™ SBO 2/10 Universal blow molding machine where the cooled preform is heated above a polymer softening temperature (Tg) using an infrared machine to about 100 to about 110° C. for about 2 minutes (called the "reheat" stage). The softened preform can then put into a container mold, a mechanical stretch rod can be inserted into the preform to guide and stretch the preform in the axial direction. Pressurized air can be introduced in two steps: as a pre-blow of about 10-12 bar for about 0.12 secs; followed by a second-blow of about 35-38 bar to complete the blow molding of the bottle or container at a blow mold temperature of about 17° C. The stretch ratio (axial to hoop) of the final article can be from about 2:1 to 12:1, alternatively from about 8:1.

Although ISBM processing is typical for bottle blowing, modifications to the mold including the cavity beyond typical processing conditions can be necessary to enable the debossing described herein. It was found that the process of reheating the preform prior to blow molding can improve the debossing. During the reheat, preforms pass by IR (infrared) lamps that heat the preform to a temperature that can enable the bottle to stretch without fracturing or overblowing the bottle.

When producing blow molded articles using a standard heating process, the expansion of the material is uniform in all directions and generally creates smooth surfaces. However, this type of process is not suited to the production of complex articles including articles with debossing. Using a standard heating process on a complex article can result in premature cooling of non-stretched material, causing areas of over-thickness on the finished container. Preferential Heating can use a differentiated temperature profile. This selective heating process ensures that the preform expands in predefined directions to take the specific shape of the cavity especially within the shoulders, edges and emboss/deboss elements.

For instance, a typical processing seen in the industry utilizes IR lamps operating at wattages of about 2500W to about 3000W. However, it was found that specific zones during reheat required manipulation to permit the preform shoulder area and debossing area to heat less than other areas of the preform. The inventors found by reducing the heat to operating wattages of about 1-25% lower wattage, alternatively about 10% lower wattage, than other areas of the preform. These optimized specific zonal temperatures effect the amount of stretching in the neck/shoulder and debossed elements to yield sharper edges at the bottle edges as well as unique surface in the debossing area.

Additionally, necessary to enable the debossing described herein, an additional cooling step was added to cool the mold. This additional cooling is added to the mold to reduce the shoulder sink often experienced in post molding. The increased cooling in the neck/shoulder area was operated with cooling temperatures at about 3° C.-20° C., alternatively about 10° C. to about 13° C.

Surface modifications are made to the mold. A specific area of the mold can be embossed and be stamped out in relief with a height of about 0.05 mm to about 1.2 mm, alternatively about 0.1 mm to about 1 mm, and alternatively from about 0.25 mm to about 0.7 mm. The height of the embossed area on the mold can result in a debossed element that is stamped into the article with the same or similar depth. The surface texture within the emboss can be created by using a standard electrical discharge machining (EDM) process with an EDM machine such as the Mitsubishi EA8 Sinker EDM. The optimal emboss area finish was about 7 Ra as measured by the Surface Roughness Measurement Method, described herein.

This combination of processing changes, emboss depth on the mold, and surface texturing to the mold within the emboss area can lead to a final bottle with sharp edges, glossy finish, and an overall eye-catching appearance. The final bottle can have perceptible debossing with sharp edges and there can be unique contrast between a glossy bottle and a matte or textured debossed element.

EXAMPLES

The following examples illustrate the articles described herein. It will be appreciated that other modifications of the present invention within the skill of those in the blow molded packaging art can be undertaken without departing from the spirit and scope of this invention. All parts, percentages, and ratios herein are by weight unless otherwise specified.

Table 1, below, compares the surface roughness imparted to the embossed area of the mold finish and the translation of surface roughness from the mold to the debossed element of the bottle. Examples A and B were made according to the method described herein.

TABLE 1

| | Ex. A | Ex. B |
| --- | --- | --- |
| Layer A (comprising outer surface) | PET + 0.2% Trans Midnight Red III Toner masterbatch | PET + 0.2% Trans Midnight Red III Toner masterbatch |
| Layer B | PET + 12% satin red pearl masterbatch | PET + 12% satin red pearl masterbatch |
| Layer A (comprising inner surface) | PET + 0.2% transparent red masterbatch | PET + 0.2% transparent red masterbatch |
| Thickness of Layers (μm) | A (outer) = 170 A (inner) = 140 B = 70 | A (outer) = 170 A (inner) = 140 B = 71 |
| Thickness of debossed element | 0.4 mm | 0.4 mm |
| Technology | ISBM | ISBM |
| Ra (μm) of Mold finish | 12.5 +/− 0.5 | 3.15 +/− 0.2 |
| Ra (μm) of Bottle of non-debossed area | 0.05 +/− 0.01 | 0.05 +/− 0.01 |
| Ra (μm) of Bottle of debossed element | 2.84 +/− 0.9 | 0.57 |
| Roughness Ratio of Bottle (Ra deboss/Ra non-deboss) | 56.8 | 11.4 |

TABLE 1-continued

|  | Ex. A | Ex. B |
| --- | --- | --- |
| Gloss of non-debossed area at 20° (GU) | 101 +/− 0.5 | 103 +/− 1.5 |
| Gloss of debossed element at 20° (GU) | 3 +/− 0.6 | 70 +/− 2.2 |

Both Example A and Example B are multilayer articles with similar compositions and both articles have high gloss in a non-debossed area at 20° C. The debossed element is also about 0.4 mm thick in both examples. However, the surface roughness of the mold that was used to make Example A is rougher than the surface roughness of the mold to make Example B. Therefore, the debossed element in Example A has a significantly rougher surface than the debossed element of Example B as indicated by higher roughness values and lower gloss 20° values. The ratio of the roughness of the debossed element to the non-debossed element is significantly larger for Example A. Although both examples may be acceptable, Example A can have a more striking debossed element that can be visually perceptible to consumers. Additionally, Table 1 shows that a Roughness Ratio of greater than 50 can result in a gloss differential of greater than 95 GU between the deboss and non-deboss areas.

Interestingly, to achieve a surface roughness of 0.5 μm or greater on the bottle, a roughness of about 3 μm may be required for the mold finish. Alternatively, to achieve a surface roughness of 2.8 μm or greater on the bottle, a roughness of about 12 μm may be required for the mold finish. The surface roughness of the mold may be much greater than the desired surface roughness of the bottle due to the self-leveling properties of the resins, in particular PET, whereby surface features tend to smooth out during the blow molding process.

Table 2, below, compares the wall thickness and layer thicknesses of the non-debossed area and the debossed element of Example 1 and Example 2. Examples 1 and 2 are both multilayer articles where Layer A (as reported in Table 2, below) comprises the outer surface of the container and the Layer B is between the Layer A and a second Layer A that comprises the inner surface. The composition of Layer A and Layer B are the same as reported in Table 1, rows 1-3. Example 1 was made using standard method of drying the raw materials and processed using a co-injection press to make the preform and further processed using an ISBM to make the final article. The preform for Example 1 was made with a concentric injector nozzle arrangement. Example 2 was made according to the method described herein. The preform for Example 2 was made with an off-center injector nozzle arrangement, which resulted in the article of Example 2 to have a thicker Layer A that comprised the outer surface of the article.

TABLE 2

|  | Example 1 | | Example 2 | |
| --- | --- | --- | --- | --- |
|  | Non-Deboss Area | Deboss Element | Non-Deboss Area | Deboss Element |
| Average Layer A Thickness (outer surface) (mm) | 0.182 ± 0.007 | 0.178 ± 0.013 | 0.261 ± 0.009 | 0.295 ± 0.007 |
| Average Layer A Thickness (inner surface) (mm) | 0.161 ± 0.006 | 0.129 ± 0.006 | 0.087 ± 0.006 | 0.088 ± 0.006 |
| Average Wall Thickness (mm) | 0.502 ± 0.005 | 0.482 ± 0.015 | 0.467 ± 0.006 | 0.498 ± 0.009 |
| Layer A (outer surface) Thickness/Wall Thickness | 36.2% ± 1.2% | 36.9% ± 2.3% | 55.9% ± 1.8% | 59.1% ± 1.3% |
| Layer A (inner surface) Thickness/Wall Thickness | 32.2% ± 1.1% | 26.9% ± 2.5% | 18.6% ± 1.8% | 17.7% ± 1.2% |

In Table 2, the thickness of Layer A and Layer B was determined by the Micro CT Method, described herein, and the average wall thickness was determined by the Local Wall Thickness Method, described herein.

In Example 1, the Layer A (comprising the outer surface) is about 5 microns thinner in the deboss region as compared to a non-deboss region taken at a similar bottle height as the deboss element. In Example 1, the total wall thickness is thinner in the deboss element as compared to the non-deboss area.

However, in Example 2, the Layer A (comprising the outer surface) is about 34 μm thicker within the deboss element versus a non-deboss region taken at a similar bottle height as the deboss element. This additional thickness can enhance the impression of depth across the deboss element and especially at the interface between the deboss element and non-deboss area. In Example 2, the total wall thickness is greater in the deboss element versus non-deboss region. A consumer may prefer the more noticeable embossing of Example 2 as compared to Example 1.

Figure 4A:
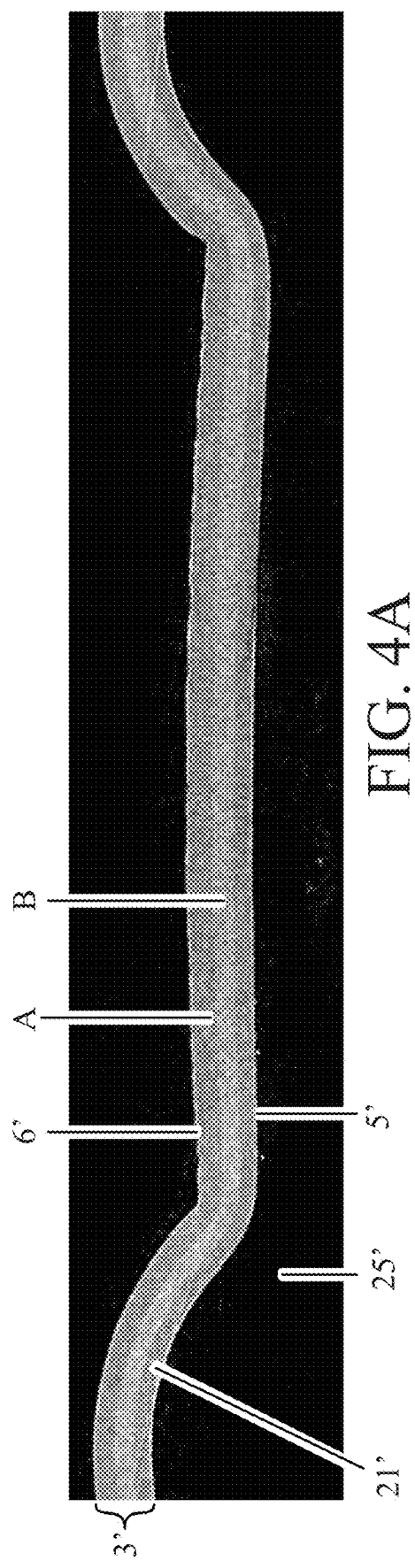
FIG. 4A is a micro-CT image of a cross section of the article wall of Example 1.

A microCT image of a cross section of the article wall 3' of Example 1 with hollow body 25', inner surface 5' and an outer surface 6' is in FIG. 4A. A microCT image of a cross section of the article wall 3" of Example 2 with hollow body 25", inner surface 5" and an outer surface 6" is FIG. 4B. The microCT images shows three layers for both Examples 1 and 2, including Layer A (A) that includes the outer surface (6' and 6") and layer B (B) with effect pigments. In Example 1, the outer and inner layers (Layer A) are approximately the same width. In Example 2, the outer and inner layers (Layer A) are different thicknesses, with the Layer A comprising the outer surface is significantly thicker than the Layer A comprising the inner surface.

Figure 4B:
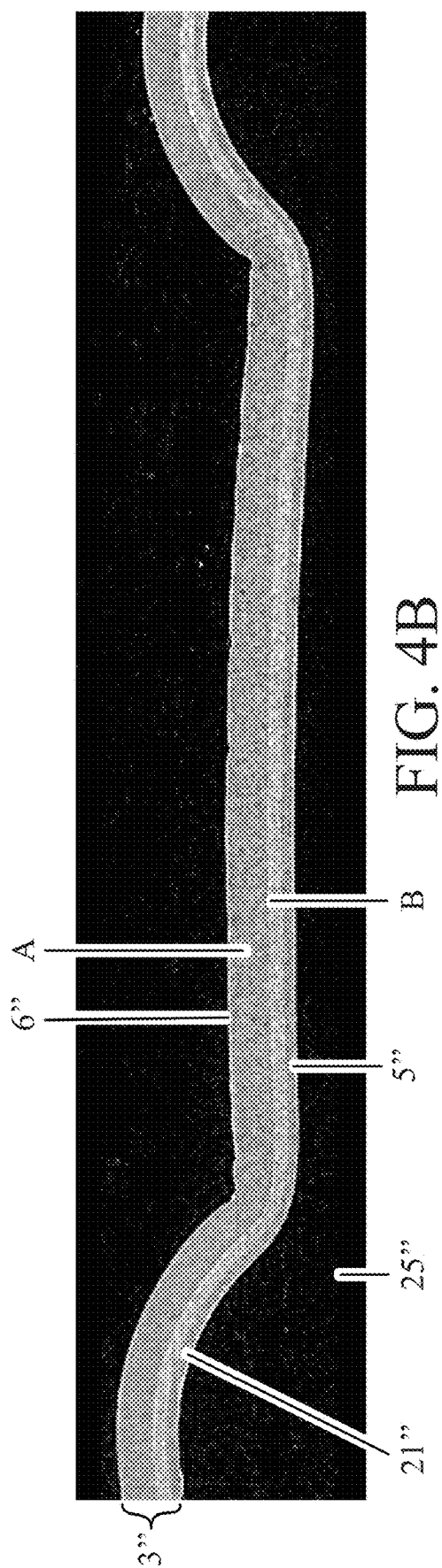
FIG. 4B is a micro-CT image of a cross section of the article wall of Example 2.

FIGS. 4A and 4B also show a region of curvature (21' and 21") at the interface of the deboss element and non-deboss area. At this region of curvature, the outer surface of the bottle (Layer A) as well as the trajectory of Layer B substantially deviate from the tangent plane of the outer bottle wall surface (Layer A) within the adjacent deboss element and non-deboss area on either side of the region of curvature. The tangent plane can be drawn as a vector parallel to the surface of the bottle (Layer A) along the region of curvature and the adjacent deboss element and non-deboss area on either side of the region of curvature.

Figure 5A:
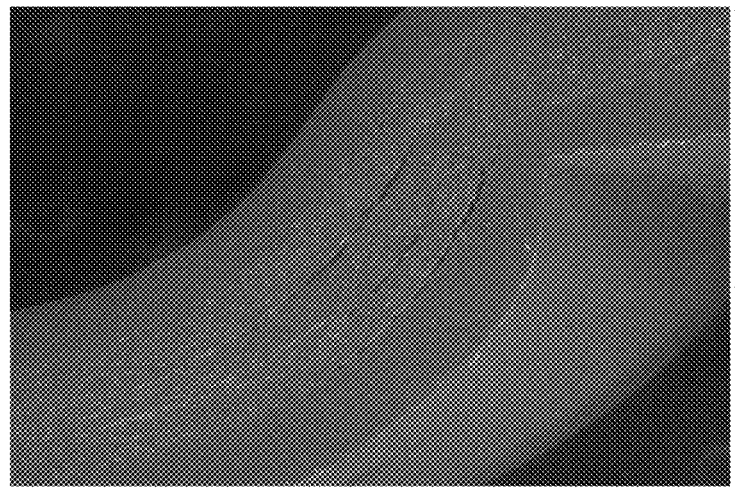
FIG. 5A is a SEM image of a cross section of the article wall that includes a debossed element and non-deboss areas of Example 1 at 96×.
Figure 5B:
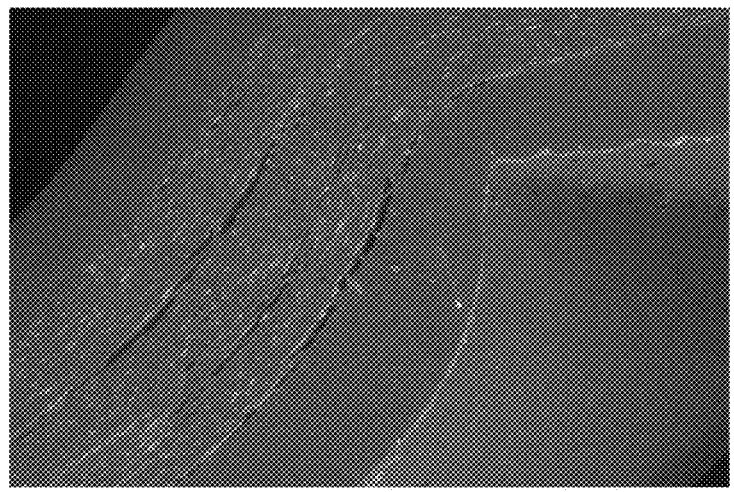
FIG. 5B is a SEM image of a cross section of the article wall at the interface that includes a debossed element and non-deboss areas of Example 1 at 148×.

FIGS. 5A and B are SEM images of the bottle wall cross-section at the region of curvature of Example 1 at 96× and 148×, respectively. The SEM images show the region of curvature between the deboss element and non-deboss area in greater detail such that the majority of platelets comprising the effect pigment are aligned with their surface normal parallel with the surface normal of the curved surfaced (Layer A). Since the surface normal of the platelets within the region of curvature are substantially different from the surface normal of platelets within the adjacent deboss and non-deboss regions on either side of the region of curvature, the optical response from the region of curvature is different from the adjacent regions which serves to provide a feature of contrast. Without being bound by theory, this feature of contrast can include a change in lightness or flop, chromaticity, sparkle, pearlescent or the like which are commonly attributed to angle dependent optical behavior of effect pigments. The feature of contrast is furthermore accentuated by the depth, gloss, and chroma provided by transparent Layer A.

To obtain the SEM images in FIGS. 5A and B, the samples were prepared as follows: Regions at the deboss and non-deboss interface of the bottle wall were removed by cutting out this region with a utility knife, then cutting it further down to about 1×2 cm using a scissors or single edge Teflon coated razor blade. A cross-sectional surface of the bottle wall was generated using a sharp razor blade, preferably a stainless steel single edge, PTFE-coated stainless-steel GEM® blade. The cutout portions are mounted with the cross-sectional surface facing up on a standard SEM stub by affixing with double sided conductive tape (carbon or copper). The edges of the bottle piece are painted with a small amount of conductive paste (carbon or silver) to ensure good electrical contact to the SEM stub. The sample mounted on the stub is coated for about 100 seconds with thin gold by a good quality sputtering system such as the Denton Desk V (Denton Vacuum, Moorestown, N.J.). The thickness of the coating is judged by one skilled in the art but is generally less than 100 seconds at about 38 mA which is enough thickness to prevent charging but having as little impact on the surface texture as possible. The coated samples were imaged under high vacuum with a field emission SEM such as the FEI Quanta 450 FEG at using between 2-5 kV accelerating voltage.

Figure 6:
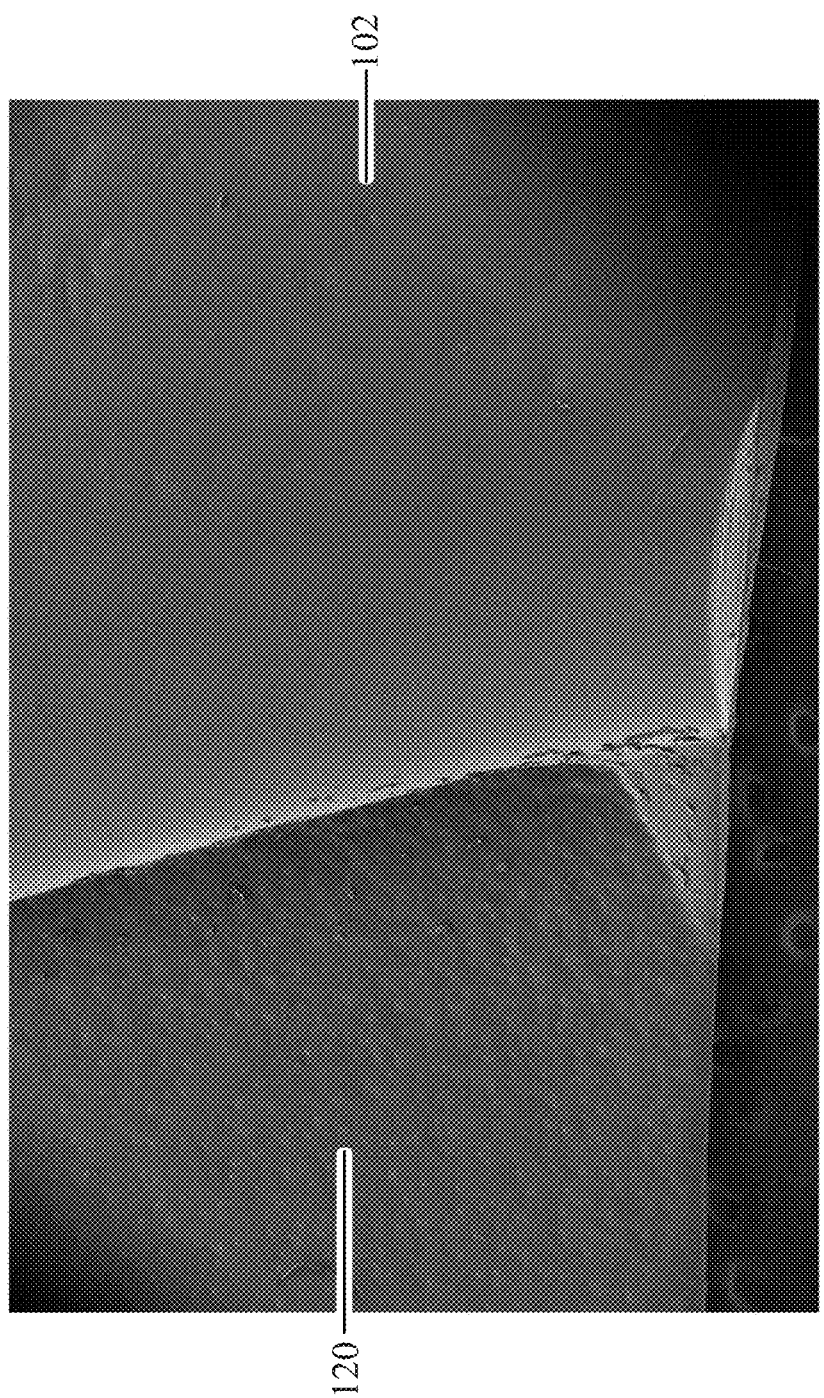
FIG. 6 is a SEM images of the surface of the article at the interface of the deboss element and non-deboss area of Example 1 at 50×.

FIG. 6 is an SEM image of the bottle wall outer surface at the interface of deboss element and non-deboss area of Example 1 at 50×. The SEM image shows the large difference in surface roughness between the deboss element 120 and non-deboss area 102. The surface roughness from each area is, without being bound by theory, responsible for the gloss or matte appearance such that the smooth surface of the non-deboss area can result in a high gloss appearance while the rough surface of the deboss element can result in a matte appearance.

To take the SEM images in FIG. 6, the samples were prepared as follows: Regions of the deboss element of the bottle wall were removed by cutting out this region with a utility knife, then cutting it further down to about 1×2 cm using a scissors or single edge Teflon coated razor blade. The cutout portions are mounted with the outer bottle surface facing up on a standard SEM stub by affixing with double sided conductive tape (carbon or copper). The edges of the bottle piece are painted with a small amount of conductive paste (carbon or silver) to ensure good electrical contact to the SEM stub. The sample mounted on the stub is coated for about 100 seconds with thin gold for by a good quality sputtering system such as the Denton Desk V (Denton Vacuum, Moorestown, N.J.). The thickness of the coating is judged by one skilled in the art but is generally less than 100 seconds at about 38 mA which is enough thickness to prevent charging but having as little impact on the surface texture as possible. The coated samples were imaged under high vacuum with a field emission SEM such as the Hitachi S-4700 at using between 2-5 kV accelerating voltage.

Test Methods

When the article is a container or a bottle, the critical normal load, gloss 20°, opacity, and haze and reflection measurements were all performed on a sample panel that was removed from the article. Unless stated in the examples or methods as a comparison between deboss and non-deboss areas, the measurements are performed on non-debossed areas. Samples with dimensions of 100 mm in length and about 50 mm in width are cut out from the main portion of the article wall and at least 50 mm away from should/neck and base regions.

When the article does not allow taking a sample this large, shorter samples in scale 1:2 width: length may be used as detailed further below. For containers and bottles, the sample is preferably removed from the label panel of the bottle at least 50 mm away from shoulder/neck or base regions. The cutting is done with a suitable razor blade or utility knife such that a larger region is removed, then cut further down to suitable size with a new single edge razor blade.

The samples should be flat if possible or made flat by using a frame maintaining the sample flat at least in the region where the test is done. It is important that the sample is flat to determine the Critical Normal Load, the gloss 20°, profilometry, opacity, and haze and reflection.

Critical Normal Load (N) and Scratch Depth at Region of Failure

If the sample readily delaminates upon removal from the bottle, the sample is given a score of 0 N for the "Critical Normal Load". For samples which remain intact, they are subjected to scratch-induced damage using a Scratch 5 from Surface Machine Systems, LLC according to Scratch Test Procedures (ASTM D7027-13/ISO 19252:08) using a 1 mm diameter spherical tip, Initial Load: 1 N, End Load: 125 N, Scratch Rate: 10 mm/s, and Scratch Length of 100 mm. For samples smaller than 100 mm, the Scratch Length can be decreased while keeping the initial and end loads the same. This provides an estimate of the Critical Normal Load. Using this estimate, additional samples can be run over a narrower load range to provide more accurate determination of the Critical Normal Load.

Scratch-induced damage is performed on both sides of the sample corresponding to the inner and outer surface of the bottle. It is critical that the sample is affixed to the sample stage by the use of foam-based double-sided tape such as Scotch® Permanent Mounting Tape by 3M (polyurethane double-sided high-density foam tape with acrylic adhesive having a total thickness of about 62 mils or 1.6 mm, UPC #021200013393) on the underside of the sample. All samples are cleaned with compressed air before the scratch test.

The Point of Failure is visually determined after completing the scratch test as the distance across the length of the scratch at which the onset of visible delamination occurs. Delamination introduces an air gap between layers which is visible to the naked eye or with assistance of a stereomicroscope by one skilled in the art. as. This is validated based on a minimum three scratches per each side of the sample (defined as the cut out from bottle above) with a standard deviation of 10% or less. The side with lower Critical Normal Load is reported as the result of this method. The Scratch Depth at Region of Failure is measured according to ASTM D7027 across the scratch location at the point which the onset of delamination occurs. The Critical Normal Load (N) is defined as the normal load recorded at the location determined to be the Point of Failure. A Laser Scanning Confocal Microscope (KEYENCE VK-9700K) and VK-X200 Analyzer Software is used to analyze scratch-induced damage including the Point of Failure, Scratch Width, and Scratch Depth.

Gloss 20° Method

Gloss 20° is measured with a gloss meter such as the micro-TRI-gloss (BYK-Gardner GmbH) at 20° according to ASTM D2457-13. Each point is measured three times and the mean is calculated to determine the gloss 20°. All gloss measurements were done over black background which we refer to as "Base Black." Base Black is the black area from the X-Rite Grey Scale Balance Card (45as45 L*a*b* 21.077 0.15-0.29). The measurements provided by the Micro-Tri Gloss meter have the unit "GU" which stands for "gloss units."

The minimal measuring area for Gloss 20° with the micro-TRI-gloss is 10×10 mm Haze and Reflection Methods: Haze Anisotropy, Peak Specular Reflectance (GU), and Reflection Softness (FW at 3/5 Height of Specular Profile)

The haze reported here is also called reflected haze and it is measured with a haze meter/goniophotometer such as a Rhopoint IQ (20°/60°/85° Glossmeter, DOI Meter, Haze Meter, Goniophotometer, Rhopoint Instruments Limited) according to ASTM E430. Reflected Haze=100× (Σ Pixels from 17° to 19° (sample)+ΣPixels from 21° to 23° (sample))/Specular Gloss (Standard)

The Haze Anisotropy is the ratio of haze (ie. reflected haze) measured for bottle samples when oriented parallel with the bottle height versus haze measured upon rotating the sample by 90°.

The Peak Specular Reflectance is measured at 20° with a diode array covering +/−7.25° from the specular angle in steps of 0.028°. Reflection Softness is measured from the Specular Profile (+/−5.6° from Specular Angle in Gloss Units) as the full width (FW) at 3/5 of the peak height for the specular profile peak.

Local Wall Thickness

Wall thickness at specific locations was measured using an Olympus Magna-Mike® 8600 using a ⅛" dia. target ball. Three measurements were taken at each location and the mean was calculated to determine the local wall thickness.

The average local wall thickness was determined by determining the local wall thickness as described above across the length of the article or panel and then calculating the mean. The thickness near the shoulder, near the base, and the debossed element is excluded from the average local wall thickness.

Surface Roughness Measurement Method

A sample panel is analyzed for Ra (arithmetical mean height) using a portable surface roughness tester such as the Surftest SJ-210 (Mitutoyo America Corporation) was placed at an even height of the bottle. The roughness is measured in units of μm.

The average Surface Roughness Measurement is determined by determining the Ra as described above across the length of the article, panel, or portion and then calculating the mean. The areas near the shoulder, near the base, and the debossed element (unless otherwise specified) is excluded from the average Gloss 20°.

Opacity Test Method

Optical Density is measured on cut out portions of the bottle using a transmission densitometer with a 3 mm diameter aperture such as the X-rite 341(X-Rite Inc, Grand Rapids, Mich.) or equivalent. The Density is used to calculate % Opacity. The instrument is calibrated and operated according to the Operator's Guide. Before use, the null (zero) is established without any sample inserted into device and calibration is confirmed using a 5-step NIST certified calibration wedge (e.g. part no: 301-37, X-Rite Inc) or equivalent.

Three measurements are taken from each representative region across flat cut out portions of the bottle and the density is recorded to the nearest 0.01 units.

Average the density for each set of three readings. Calculate the % Opacity for each averaged specimen as:

$$\% \text{ Opacity} = (1-10^{-D}) \times 100$$

where D is the average density, and report to the nearest 0.01%.

For example, an optical density (D) of 3.00=99.90% Opacity, an optical density of 0.50=68.38% Opacity and 0.00=0.00% Opacity.

Micro-CT Method for Layer Thickness

Sample Preparation

Samples of the bottles to be tested are imaged using a micro-CT X-ray scanning instrument capable of scanning a sample having dimensions of approximately 16 mm×16 mm×3 mm a single dataset with contiguous voxels. An isotropic spatial resolution of 3.5 μm is required in the datasets collected by micro-CT scanning. One example of suitable instrumentation is the Scanco™ Medical μCT 50 scanner (Scanco™ Medical AG, Brüttisellen, Switzerland) operated with the following settings: energy level of 55 kVp at 72 μA, 3000 projections, 20 mm field of view, 750 ms integration time, an averaging of 6, and a voxel size of 3.5 μm.

Test samples to be analyzed are prepared by cutting a rectangular piece of the plastic from the wall, preferably label panel region at approximately the same height with an X-acto® knife and then further trimming the sample to approximately a 16 mm diameter disc using high quality scissors such as Roboz™ operating scissors (Roboz™ Surgical Instrument Company, Inc. Gaithersburg, Md., USA) with care to avoid causing cracks. The sample is positioned with mounting foam material such as Mr. Clean® Magic Eraser (Procter and Gamble®, Cincinnati, Ohio) and placed in a μCT plastic cylindrical scanning tube and secured inside the micro-CT scanner. The surface of the disc was placed congruent with the scanning tube platform which will represent the XY plane in the dataset.

The instrument's image acquisition settings are selected such that the image intensity contrast is sensitive enough to provide clear and reproducible discrimination of the sample structures from the air and the surrounding mounting foam. Image acquisition settings that are unable to achieve this contrast discrimination or the required spatial resolution are unsuitable for this method. Scans of the plastic sample are captured such that a similar volume of each sample with its caliper is included in the dataset. Software for conducting reconstructions of the dataset to generate 3D renderings is supplied by the scanning instrument manufacturer. Software suitable for subsequent image processing steps and quantitative image analysis includes programs such as Avizo Fire 9.2 (Visualization Sciences 25 Group/FBI Company, Burlington, Mass., U.S.A.), and MATLAB™ version 9.5 with corresponding MATLAB™ Image Processing Toolbox (The Mathworks™ Inc. Natick, Mass., U.S.A.). Micro-CT data collected with a grey level intensity depth of 16-bit is converted to a grey level intensity depth of 8-bit, taking care to ensure that the resultant 8-bit dataset maintains the maximum dynamic range and minimum number of saturated voxels feasible, while excluding extreme outlier values.

Image Processing

The 3D dataset containing the punched bottle material is trimmed such that the material bisects the dataset along the z axis. Hence, there will be a top space above the material and a bottom space below the material. (XY planes will exist in the top space and bottom space that consist of only void voxels.) Trimming should avoid noise or artifacts caused by the mounting material or CT scanner. The punch may cause delamination at the edges. This too should be avoided by proper trimming A histogram of the trimmed dataset should be bimodal. The valley in the histogram will give a threshold that will separate the data between void space and material. An automated technique such as Otsu's method can be used to find the threshold. Connected components can be used to remove any noise in the void spaces. The mask resulting from the thresholding should have a void space above the material, a seam of material and a void space below the material.

Within the seam of the material is another seam, the co-injected pigment seam. The density of the pigment seam is similar to the material surrounding it. This results in a noisy μCT image. One skilled in the art can remove the noise (which is mostly speckle noise) with median filters, image morphology and connected components. The pigment seam can also be masked by an operator. Correct masking of the seam can be verified using independent seam measurements. For example, the average width of the seam mask can be compared to a microscopy image of the seam. It may also be necessary to mask out other μCT scan artifacts such as the center artifact.

The material has been punched from a bottle, hence the punch is likely nonplanar, making linear measurements difficult. Distance measurement in the μCT dataset will be made instead using perimeter voxels and a Euclidian Distance Map (EDM). For example, the distance from the top of the pigment seam to the top of the material, which is the outer surface of the article, can be made in two steps. First an EDM is generated from the pigment mask. The EDM assigns voxels values in a new dataset based on their closest distance to the pigment mask. Secondly, voxels at the top of the material can by identified using the perimeter of the top void space. The perimeter voxel's position will correspond to an EDM voxel position and the EDM value at that voxel position gives the closest distance to the pigment mask. From this collection of distance voxels, measurement statistics such as the layer thicknesses can be derived.

Combinations

A. A blow molded multilayer article comprising:
a hollow body defined by a wall comprising at least three layers, a first Layer A comprising an outer surface of the wall, a second Layer A comprising the inner surface of the wall in that region and a Layer B between the first and second Layer As;
wherein the first and second Layer A are transparent and optionally comprise a colored dye or pigment;
wherein the Layer B comprises an effect pigment and/or an opacifying pigment;
wherein the A-layers and B-layers comprise a thermoplastic resin;
wherein the wall comprises a deboss element and a non-deboss area;
wherein the wall at the non-deboss element comprises a thickness;
wherein the wall at the deboss element comprises a thickness and wherein the thickness of the deboss element is greater than the thickness of the non-deboss area.

B. The article according to Paragraph A, wherein the deboss element is visually perceptible.

C. The article according to Paragraphs A-B, wherein the first layer A comprises a thickness and the second layer A comprises a thickness and the thickness of the first layer A is greater than the thickness of the second layer A.

D. The article according to Paragraphs A-C, wherein the thickness of the first Layer A in the debossed area can be at least 5 μm greater than the thickness in the non-debossed area, preferably at least 10 μm greater, more preferably at least 20 μm greater, and even more preferably at least 25 μm greater.

E. The article according to Paragraphs A-D, wherein the thickness of the first Layer A in the debossed area can be from about 10 μm to about 90 μm larger than the thickness in the non-debossed area, preferably from about 20 μm to about 60 μm larger, and more preferably from about 25 μm to about 50 μm larger.

F. The article according to Paragraphs A-E, wherein the debossed element comprises a surface roughness of greater 0.5 μm, preferably greater than 0.75 μm, and more preferably greater than 2 μm.

G. The article according to Paragraphs A-F, wherein the roughness ratio (Ra deboss/Ra non-deboss) of the article can be from about 15 to about 100, preferably from about 30 to about 80, and more preferably from about 45 to about 65.

H. The article according to Paragraphs A-G, wherein the Layer B in the deboss element comprises a thickness from about 20 μm to about 300 μm, preferably from about 50 μm to about 200 μm, more preferably from about 60 μm to about 170 μm, and even more preferably from about 65 μm to about 150 μm.

I. The article according to Paragraphs A-H, wherein a location of the non-debossed area 1 mm from a curvature of the debossed element can have a gloss 20° of from about 50 to about 125 GUs, preferably about 60 GUs to about 120 GUs, more preferably rom about 70 to about 115 GUs, and even more preferably from about 80 GUs to about 110 GUs.

J. The article according to Paragraphs A-I, wherein there is an interface region between the first Layer A and Layer B where Layer A and Layer B are slightly interpenetrated.
K. The article according to Paragraphs A-J, wherein the layers are adhered without adhesive.
L. The article according to Paragraphs A-K, wherein the average panel wall thickness of the non-debossed area can be from about 250 μm to about 2.5 mm, preferably from about 350 μm more preferably from about 400 μm to about 600 μm.
M. The article according to Paragraphs A-L, wherein the average panel wall thickness of the debossed element can be from about from about 250 μm to about 2 mm, preferably from about 350 μm to about 1 mm, more preferably from about 450 μm to about 575 μm, and even more preferably from about 485 μm to about 550 μm.
N. The article according to Paragraphs A-M, wherein the B layer comprises an effect pigment comprising a pearlescent pigment and wherein the effect pigment is about 0.01% to about 5%, by weight of the Layer B.
O. The article according to Paragraph N, wherein the effect pigment comprises platelet-like pigments with a face wherein the pigments are primarily oriented so that the face is parallel to the outer surface of the article.
P. The article according to Paragraphs A-O, wherein a wall in the region where the three layers are present comprises a Critical Normal Load greater than 30 N, preferably greater than 50 N, and preferably greater than 70 N.
Q. The article according to Paragraphs A-P, wherein the article comprises more than about 80 wt % of one or more thermoplastic resins selected from a group consisting of polyethylene terephthalate (PET), high-density polyethylene (HDPE), low-density polyethylene (LDPE), polypropylene (PP), polyvinylchloride (PVC), polyethylene terephthalate glycol (PETG), polyethylene naphthalate (PEN), polystyrene (PS), and combinations thereof.
R. The blow molded multilayer article according to Paragraph Q, wherein the multilayer article comprises polyethylene terephthalate.
S. The article according to Paragraphs A-R, wherein the article has a non-cylindrical shape.
T. The article according to Paragraphs A-S, wherein the article comprises a location on the outer surface with a haze of less than 20.
U. The article according to Paragraphs A-T, wherein the article comprises a location on the outer surface with a haze anisotropy of less than or equal to 0.9.
V. The article according to Paragraphs A-V wherein the article is a bottle.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded multilayer article comprising:
   a hollow body defined by a wall comprising at least three layers, a first Layer A comprising an outer surface of the wall, a second Layer A comprising the inner surface of the wall and a Layer B between the first and second Layer A;
   wherein the first and second Layer A are transparent and optionally comprise a colored dye or pigment;
   wherein the Layer B comprises a pigment;
   wherein the first Layer A comprises a thermoplastic resin selected from a group consisting of polyethylene terephthalate (PET), high-density polyethylene (HDPE), low-density polyethylene (LDPE), polypropylene (PP), polyvinylchloride (PVC), polyethylene terephthalate glycol (PETG), polystyrene (PS), and combinations thereof;
   wherein the second Layer A and the Layer B comprise the same thermoplastic resin as the first Layer A;
   wherein the first and second Layer A are adhered to the Layer B without visible delamination seen by a bubble-like appearance visible through the inner and outer outer surfaces of the wall;
   wherein the outer surface of the wall comprises a deboss element and a non-deboss area, wherein the deboss element has a different texture as compared to the non-deboss area.

2. The article according to claim 1, wherein the deboss element is visually perceptible.

3. The article according to claim 1, wherein the first layer A comprises a thickness and the second layer A comprises a thickness and the thickness of the first layer A is greater than the thickness of the second layer A.

4. The article according to claim 3, wherein the thickness of the first Layer A in the debossed area is at least 5 μm greater than the thickness of the first Layer A in the non-debossed area.

5. The article according to claim 1, wherein the debossed element comprises a surface roughness of greater 0.5 μm.

6. The article according to claim 1, wherein the Layer B in the deboss element comprises a thickness from about 20 μm to about 300 μm.

7. The article according to claim 1, wherein at least 30% of the article outside the deboss element comprises a gloss 20° of greater than or equal to 65 GUs.

8. The article according to claim 1, wherein the first and second Layer A are adhered to the Layer B without adhesive.

9. The article according to claim 1, wherein the Layer B comprises from about 0.01% to about 5%, by weight of the Layer B, pigment and wherein the pigment is an effect pigment comprising platelet-like pigments with a face wherein the pigments are primarily oriented so that the face is parallel to the outer surface of the article.

10. The article according to claim 1, wherein the article has a non-cylindrical shape.

11. The article according to claim 1, wherein the article comprises a location on the outer surface with a haze of less than 20.

12. The article according to claim 1, wherein the article comprises a location on the outer surface with a haze anisotropy of less than or equal to 0.9.

13. The article according to claim 1 wherein the Layer B is opaque.

14. The blow molded multilayer article of claim 1, wherein the wall further comprises:
an interface region between the first Layer A and Layer B where Layer A and Layer B are interpenetrated with each other.

15. The article according to claim 14, wherein a wall in the region where the three layers are present comprises a Critical Normal Load greater than 30 N.

16. The article according to claim 14, wherein the wall at the non-deboss area and the wall at the deboss element comprise a thickness; and
wherein the thickness of the wall at the deboss element is greater than the thickness of the wall at the non-deboss area.

17. The article according to claim 1, wherein the thermoplastic resin consists of polyethylene terephthalate.

18. The article according to claim 1, wherein the B Layer extends across the entire wall.

19. The article according to claim 1, wherein the deboss element comprises a matte or rough texture and the non-deboss area comprises a high gloss texture.

20. The article according to claim 1, wherein the roughness ratio on the outer surface between the deboss element and the non-debossed area of the article is greater than 15.

* * * * *